US009614855B2

(12) United States Patent
McClain et al.

(10) Patent No.: US 9,614,855 B2
(45) Date of Patent: Apr. 4, 2017

(54) SYSTEM AND METHOD FOR IMPLEMENTING A SECURE WEB APPLICATION ENTITLEMENT SERVICE

(75) Inventors: Carolyn Bennion McClain, Springville, UT (US); Stephen R. Carter, Spanish Fork, UT (US)

(73) Assignee: Micro Focus Software Inc., Wilmington, DE (US)

( * ) Notice: Subject to any disclaimer, the term of this patent is extended or adjusted under 35 U.S.C. 154(b) by 853 days.

(21) Appl. No.: 12/612,882

(22) Filed: Nov. 5, 2009

(65) Prior Publication Data

US 2011/0107411 A1 May 5, 2011

(51) Int. Cl.
*G06F 15/16* (2006.01)
*G06F 17/30* (2006.01)
*H04L 29/06* (2006.01)
*H04L 29/08* (2006.01)

(52) U.S. Cl.
CPC ........... *H04L 63/102* (2013.01); *H04L 67/02* (2013.01)

(58) Field of Classification Search
CPC ................. G06F 21/6218; G06F 21/31; G06F 17/30082; H04L 63/10; H04L 63/105; H04L 63/102; H04L 67/02; H04L 9/32
USPC ......... 726/2–9; 713/168–174, 182–186, 202; 709/206, 225, 229, 249, 389
See application file for complete search history.

(56) References Cited

U.S. PATENT DOCUMENTS

| 5,428,738 | A | 6/1995 | Carter et al. |
| 5,787,175 | A | 7/1998 | Carter |
| 5,870,564 | A | 2/1999 | Jensen et al. |
| 5,878,419 | A | 3/1999 | Carter |
| 6,067,572 | A | 5/2000 | Jensen et al. |
| 6,108,619 | A | 8/2000 | Carter et al. |
| 6,119,230 | A | 9/2000 | Carter |
| 6,185,612 | B1 | 2/2001 | Jensen et al. |
| 6,219,652 | B1 | 4/2001 | Carter et al. |
| 6,275,819 | B1 | 8/2001 | Carter |

(Continued)

*Primary Examiner* — Evans Desrosiers
(74) *Attorney, Agent, or Firm* — Schwegman Lundberg & Woessner, P.A.

(57) ABSTRACT

System and method for implementing a secure web application entitlement service are described. One embodiment of the system comprises a plurality of entitlement point records each comprising a unique identifier associated therewith such that each of the enforcement point records can be associated with an enforcement point within an application; an identity service ("IS") configured to provide a first token for enabling a user to access the application; an access gateway configured to provide a second token, the second token including a list of at least a portion of the unique identifiers; an entitlement server ("ES") configured to receive an entitlement request from the application, the entitlement request including the second token, the ES further configured to associate the entitlement request with a user-authenticated session in the IS; and a policy decision point ("PDP") configured to receive the list of at least a portion of the unique identifiers and to render a decision on the entitlement request based at least in part on policy information associated with ones of the enforcement point records identified by the unique identifiers of the list and attribute information from the IS; wherein subsequent to the rendering of a decision by the PDP, the decision is communicated to the application.

17 Claims, 3 Drawing Sheets

(56) References Cited

U.S. PATENT DOCUMENTS

| | | | |
|---|---|---|---|
| 6,279,111 B1 * | 8/2001 | Jensenworth | G06F 21/335 713/159 |
| 6,405,199 B1 | 6/2002 | Carter et al. | |
| 6,459,809 B1 | 10/2002 | Jensen et al. | |
| 6,601,171 B1 | 7/2003 | Carter et al. | |
| 6,647,408 B1 | 11/2003 | Ricart et al. | |
| 6,650,777 B1 | 11/2003 | Jensen et al. | |
| 6,697,497 B1 | 2/2004 | Jensen et al. | |
| 6,738,907 B1 | 5/2004 | Carter | |
| 6,742,035 B1 | 5/2004 | Zayas et al. | |
| 6,742,114 B1 | 5/2004 | Carter et al. | |
| 6,760,843 B1 | 7/2004 | Carter | |
| 6,772,214 B1 | 8/2004 | McClain et al. | |
| 6,826,557 B1 | 11/2004 | Carter et al. | |
| 6,862,606 B1 | 3/2005 | Major et al. | |
| 6,993,508 B1 | 1/2006 | Major et al. | |
| 7,043,555 B1 | 5/2006 | McClain et al. | |
| 7,152,031 B1 | 12/2006 | Jensen et al. | |
| 7,177,922 B1 | 2/2007 | Carter et al. | |
| 7,185,047 B1 | 2/2007 | Bate et al. | |
| 7,197,451 B1 | 3/2007 | Carter et al. | |
| 7,286,977 B1 | 10/2007 | Carter et al. | |
| 7,299,493 B1 | 11/2007 | Burch et al. | |
| 7,313,816 B2 * | 12/2007 | Sinha et al. | 726/10 |
| 7,316,027 B2 | 1/2008 | Burch et al. | |
| 7,334,257 B1 | 2/2008 | Ebrahimi et al. | |
| 7,356,819 B1 | 4/2008 | Ricart et al. | |
| 7,363,577 B2 | 4/2008 | Kinser et al. | |
| 7,376,134 B2 | 5/2008 | Carter et al. | |
| 7,386,514 B2 | 6/2008 | Major et al. | |
| 7,389,225 B1 | 6/2008 | Jensen et al. | |
| 7,426,516 B1 | 9/2008 | Ackerman et al. | |
| 7,467,415 B2 | 12/2008 | Carter | |
| 7,475,008 B2 | 1/2009 | Jensen et al. | |
| 7,505,972 B1 | 3/2009 | Wootten et al. | |
| 7,506,055 B2 | 3/2009 | McClain et al. | |
| 7,552,468 B2 | 6/2009 | Burch et al. | |
| 8,051,491 B1 * | 11/2011 | Cavage | G06F 21/6218 707/609 |
| 2007/0289018 A1 * | 12/2007 | Steeves et al. | 726/24 |
| 2008/0018927 A1 * | 1/2008 | Martin | G06F 21/74 358/1.15 |
| 2009/0199277 A1 * | 8/2009 | Norman | H04L 63/105 726/5 |
| 2009/0228967 A1 * | 9/2009 | Gbadegesin et al. | 726/8 |
| 2009/0235349 A1 * | 9/2009 | Lai | H04L 9/3213 726/14 |
| 2009/0249439 A1 * | 10/2009 | Olden | H04L 63/0815 726/1 |
| 2009/0249440 A1 * | 10/2009 | Platt | H04L 63/0815 726/1 |
| 2009/0328216 A1 * | 12/2009 | Rafalovich et al. | 726/23 |

\* cited by examiner

SYSTEM AND METHOD FOR IMPLEMENTING A SECURE WEB APPLICATION ENTITLEMENT SERVICE

CROSS-REFERENCE TO RELATED APPLICATIONS

Background

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider only for what they use on a utility, or resources consumed, basis or a subscription, or time-based, basis, for example. Sharing computing power and/or storage capacity among multiple lessees has many advantages, including improved utilization rates and an increase in overall computer usage.

Cloud computing and cloud storage are rapidly becoming the preferred way for enterprises to extend their data center processing and storage capacity efficiently and inexpensively. One problem faced by modern enterprises is users accessing cloud assets in relationship to the data center. In particular, a difficulty exists in providing entitlement processing via enterprise-specified policy over cloud assets, especially web applications.

SUMMARY

One embodiment of a system for providing a secure web application entitlement service comprises a plurality of entitlement point records each comprising a unique identifier associated therewith such that each of the enforcement point records can be associated with an enforcement point within an application; an identity service ("IS") configured to provide a first token for enabling a user to access the application; an access gateway configured to provide a second token, the second token including a list of at least a portion of the unique identifiers; an entitlement server ("ES") configured to receive an entitlement request from the application, the entitlement request including the second token, the ES further configured to associate the entitlement request with a user-authenticated session in the IS; and a policy decision point ("PDP") configured to receive the list of at least a portion of the unique identifiers and to render a decision on the entitlement request based at least in part on policy information associated with ones of the enforcement point records identified by the unique identifiers of the list and attribute information from the IS; wherein subsequent to the rendering of a decision by the PDP, the decision is communicated to the application.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

The embodiments described herein provide a mechanism whereby cloud assets can be controlled by an entitlement policy. The embodiments described herein further provide a mechanism to allow an entitlement policy to be defined and communicated with cloud assets such that cloud assets can function as a policy enforcement point ("PEP").

Figure 1:
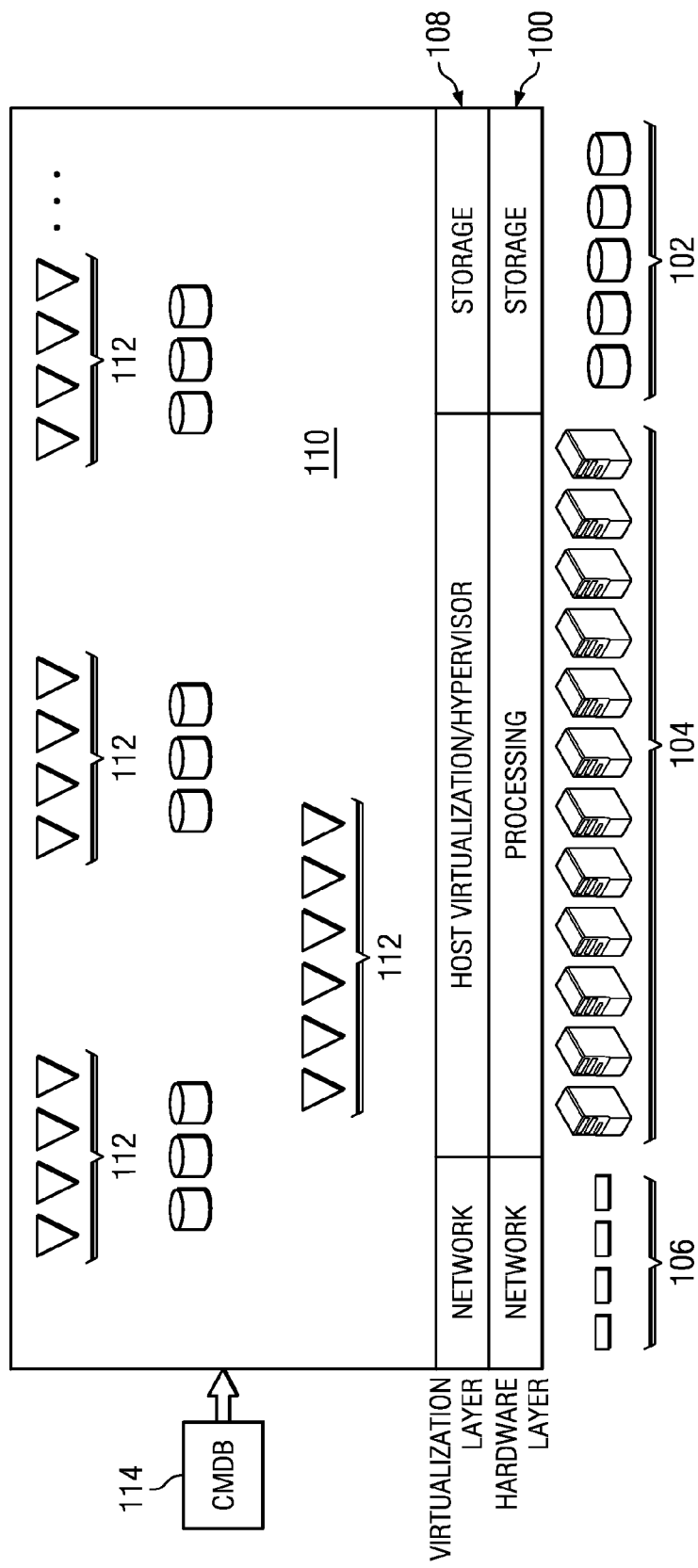
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines in virtual storage. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider has available. Having established the hardware and virtualization layers 100, 108, the assets 102, 104, and 106 available in a standardized way to workloads hosted in the workload layer 110, which is the layer the customer typically views as the "cloud". It will be recognized that some of the workloads sponsored in the cloud are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise. A typical cloud provider may be using standard ITIL processes and may utilize a configuration management database ("CMDB") 114, which affects the entire cloud infrastructure and which describes the practice and policies used for instantiating virtualized workloads and storage.

Figure 2:
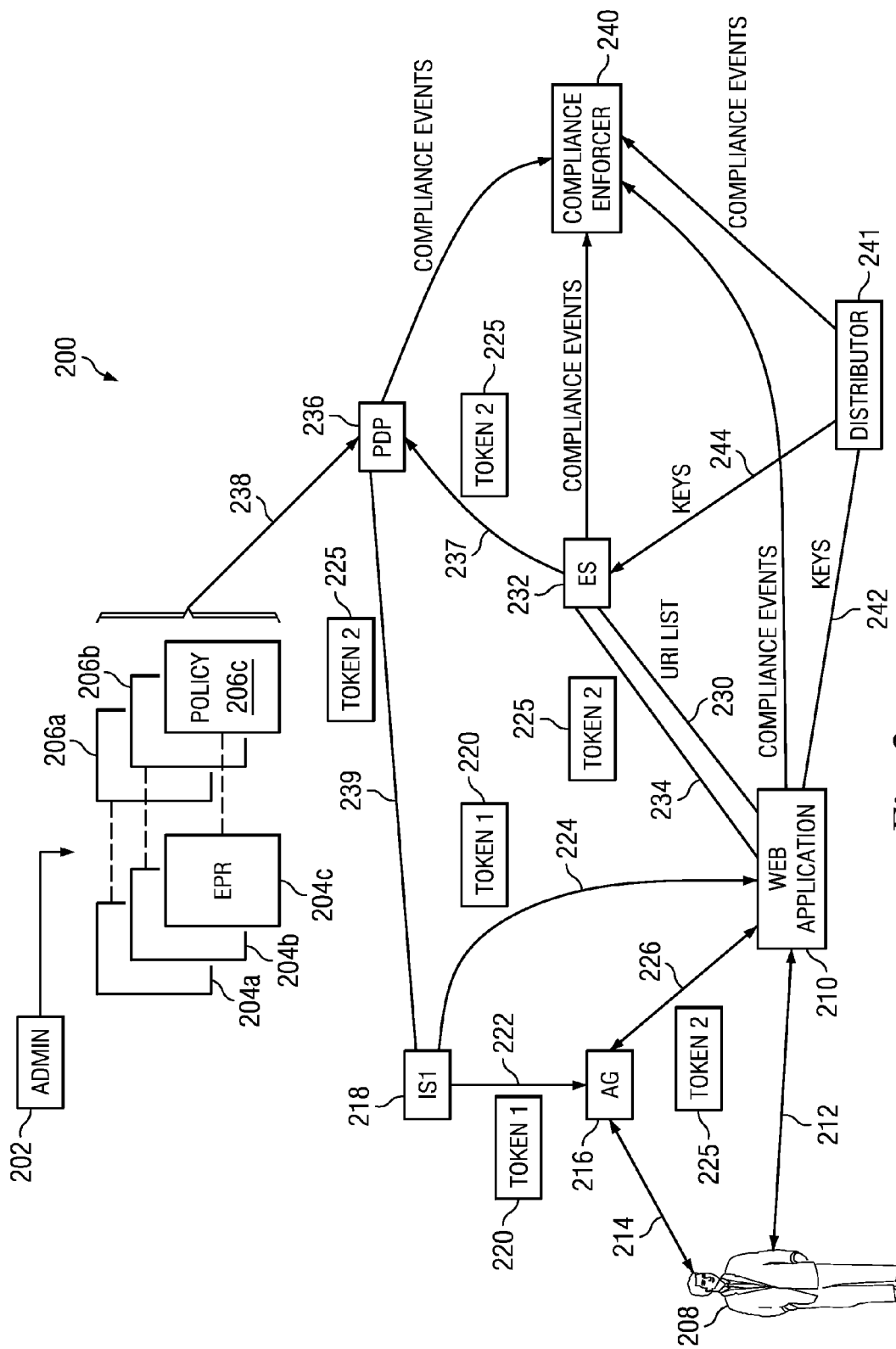
FIG. 2 is a flow diagram of one embodiment of a process for implementing a secure web application entitlement service.

FIG. 2 is a flow diagram of a system 200 for implementing a secure web application entitlement service in accordance with one embodiment. As shown in FIG. 2, an administrator 202 creates one or more entitlement point records, represented in FIG. 2 by entitlement point records 204a-204c, each of which comprises one or more Uniform Resource Identifiers ("URIs") or other addressing mechanism that allows for access to remote services and/or procedures. Each URI is mapped to a respective one of a plurality of policies, represented in FIG. 2 by policies 206a-206c, each of which comprises a collection of conditions, actions, and attribute retrieval declarations as is known in the art. Each URI is tagged such that a using application (hereinafter referred to as a "web application") can associate the URI with a specific enforcement point within the web application. In this manner, the web application can receive a list of URI's that provides an opaque mechanism for the web application to enforce an entitlement policy as will be described herein. In one embodiment the URI is used in a REST interface. It will be recognized that the records 204a-204c are stored in an appropriate storage medium accessible by the remainder of the system.

Referring again to FIG. 2, a user 208 accesses a web application 210 either via a communications channel 212 or a communications channel 214 through an access gateway ("AG") 216. The web application 210 comprises computer-executable instructions stored on at least one computer-readable medium and executed by a computer. The AG 216 comprises appropriate hardware for implementing, for example, an AG available from Novell Corporation as a part of the Access Manager product. Access via communications channel 214 or 212 initiates a known protocol ceremony wherein reference is made to an identity service ("IS") 218, which interacts with the user 208 to obtain authentication credentials. The IS 218 then generates a first token comprising an identity token 220. It will be recognized that the generation and provision of tokens in this manner will be well-known to those of ordinary skill in the art. For example, in one embodiment, the IS 218 is implemented as described in U.S. Pat. Nos. 7,299,493, 7,316,027, and 7,552,468.

The token 220 is made available to the AG 216 either via a communications channel 222 or to the web application 210 via a communications channel 224. A token returned via the communications channel 214 or 222 is well known in the art. For example, an identity token can take the form of SAML 1.x, SAML 2.x, WS-Federation, and others. It will be recognized that one purpose of an identity token is to represent a user's identity without requiring the user to be present or provide a userID and/or password. While an identity token for a user may be created from an authentication using the user's userID/password, this need not be the case.

In one embodiment, when enabling user access to the web application 210, the AG 216 provides a second token 225 via a communications channel 226. The second token 225 contains a list of the URIs that are tagged to provide the web application 210 with a way of associating a URI with an entitlement enforcement point record, such as one of the records 204a-204c. In other words, the token 225 provides a list of "protected resources" that are managed by a PEP. In the illustrated embodiment, such protected resources are identified by URI, but any sort of identifier, global or otherwise, may be substituted therefore. The token 225 also includes a protected indicator of the identity session created in the IS 218 when the user authenticated, as described above. In particular, in order to prevent protected resources from being inappropriately presented to the PEP with bogus policies, the second token 225 can include a protected indicator of the identity of the person or service requesting the protection. This usually is in the form of a digital signature, although it will be recognized that alternative and/or additional mechanisms may be employed. In one embodiment, the URI list in the token 225 could be provided by the IS 218 to the web application 210 via the communications channel 224.

In one embodiment, the URI list is not provided to the web application 210 via the AG 216 or the IS 218, in which case the web application must access the URI list via a communications channel 230. It will be recognized that access to obtain the URI list or other token information is preferably performed via a protected communications channel, such as SSL.

Once the web application 210 has access to the URI lists that are tagged such that the web application knows which URI is used to protect specific entitlement points, the web application can make a call to an entitlement server 232 via a communications channel 234. The application 210 provides the token 225 to the ES 232, thereby enabling the ES to associate a web application request with a user authenticated session in the IS 218. In addition to the token 225, the web application 210 transmits to the ES 232 the URI list, which is subsequently sent to a policy decision point ("PDP") 236 for resolution, as represented by a path 237. The PDP 236 accesses any necessary policy information from the respective policy 206a-206c via a communications channel 238 and accesses any necessary attribute information via a communications channel 239. The results, or decision, of the PDP 236 are communicated back to the ES 232 together with any attribute information that policy dictated should be sent back and the ES provides the web application 210 with the entitlement request disposition and other information as necessary to fulfill the policy. At this point, the web application 210 interrogates the results of the PDP 236 and, if allowed, entitlement is provided; otherwise, the entitlement is withheld.

It should be noted that the PDP 236, the ES 232, and the web application 210 all provide compliance events to a compliance enforcer 240, which correlates the compliance events and compares them with a best practices policy so that if an issue arises with the manner in which the PDP 236, the ES 232, and the web application 210 are interoperating, mitigating actions can be taken. For example, consider a situation in which a policy statement is not enforced properly, such as a case in which access to financial information is not allowed from connections are outside of the firewall within a blackout period and in which an access is attempted and succeeds. A mitigating action that might be taken in such a situation would be to abort the connection or vector the connection to a honeypot, for example.

The embodiments described herein enable a web application to enforce an entitlement policy that does not reside at the web application and is under the control of the enterprise administrations. Moreover, the granting or withholding of entitlement can be audited for compliance.

U.S. patent application Ser. No. 12/612,834, entitled: "System and Method for Reduced Cloud IP Address Utilization," filed on Nov. 5, 2009, and now issued as U.S. Pat. No. 8,364,842, which is incorporated by its entirety herein, describes a distributor function, which may be implemented herein as a distributor 214. In one embodiment, the distributor 241 provides keys via a communications channel 242 and a communications channel 244 so that the web application 210 and the ES 232 share a key that provides for secure communications outside of the realm of SSL. In this embodiment, the distributor 241 is also a source of compliance events, wherein the compliance enforcer 240 can correlate the events with the other events as previously discussed so that mitigation actions can be taken. It will be recognized that the particular manner in which mitigation actions are enforced is not of particular concern with respect to the embodiments described herein.

Figure 3:
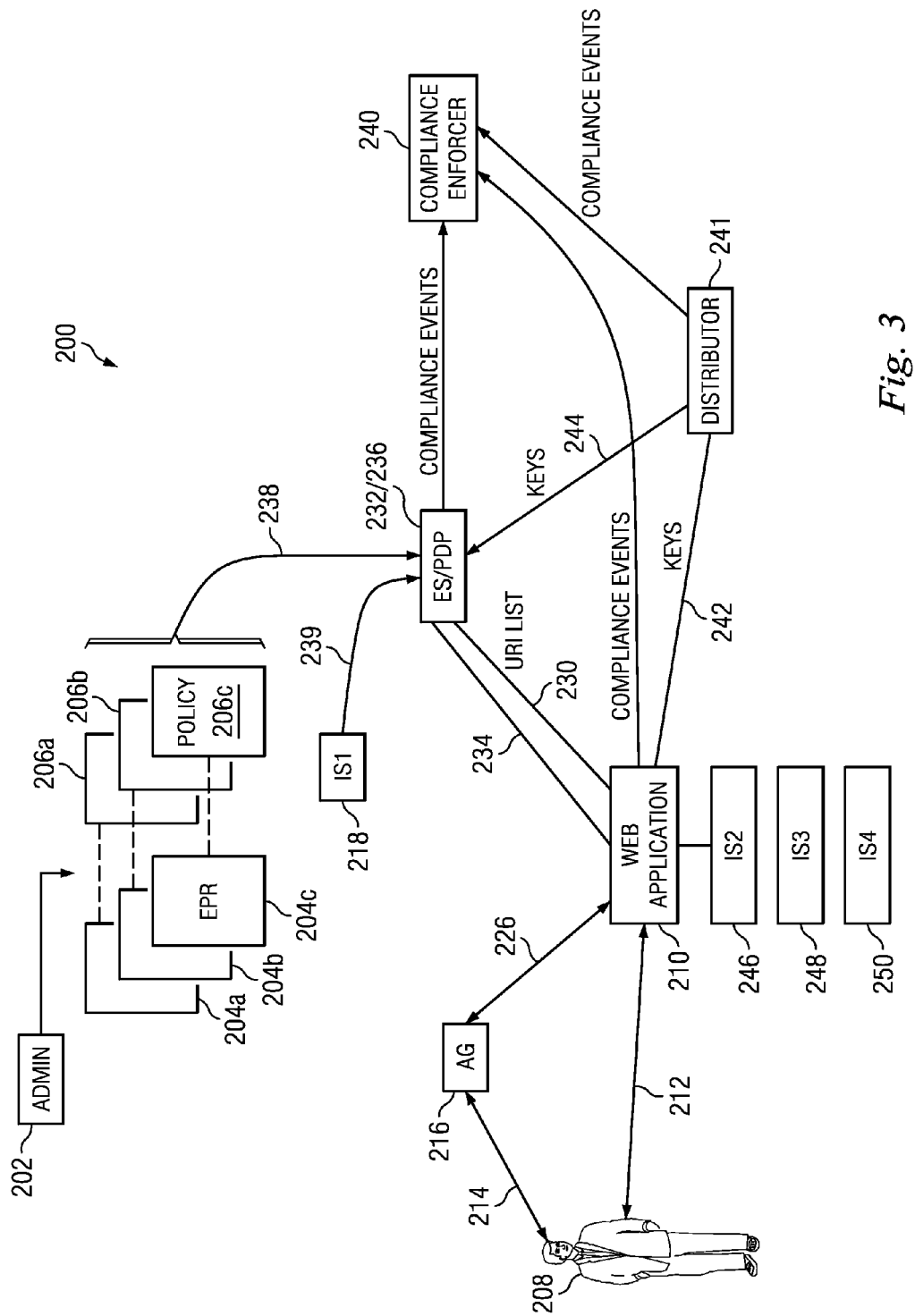
FIG. 3 is a flow diagram of an alternative embodiment of a process for implementing a secure web application entitlement service.

In an alternative embodiment, illustrated in FIG. 3, multiple ISes, represented by ISes 246, 248, 250, having some set of trust relationships are provided. For example, in one embodiment, the IS 218 has a trust relationship with ISes 246 and 248. The IS 246 has a trust relationship with ISes 218 and 250. The IS 248 has a trust relationship with IS 218 and 250. It will be noted that the trust relationships can be configured such that if the server 218 trusts the server 246 and the server 246 trusts the server 250, then the server 218 trusts the server 250; however, this must be explicitly configured in a manner that is well known in the art and will therefore not be further described. Accordingly, there is some set of ISes in which trust can be permuted across the set of ISes to accomplish the needs of the trust relationships.

Additionally, in the embodiment illustrated in FIG. 3, the ES 232 and the PDP 236 are combined because of the close process relationship they bear with respect to one another. In other words, the PDP 236 and ES 232 have a close relationship for dereferencing policy and thus being separate may be counter-productive in some instances. As a result, in the embodiment illustrated in FIG. 3, the PDP/ES 232/236 and the compliance enforcer 240 have a trust relationship with the IS 218 and the AG 216 and web application 210 have a trust relationship with the IS 246. Alternatively, the AG 216 has a trust relationship with the IS 246 and the web application 210 has a trust relationship with the IS 248.

In the general case, the AG 216, application 210, PDP/ES 232/236, and compliance enforcer 240 can be permuted over the set of ISes 218, 246, 248, and 250. As previously noted, in the embodiment illustrated in FIG. 3, the ES 232 and PDP 236 are combined into a single entity, but they could be split, as shown in FIG. 2, and placed in separate trust domains.

It will be recognized that various ones of the elements and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A secure web application entitlement service comprising:
a plurality of entitlement point records each comprising a unique identifier that permits each of enforcement point records to be associated with an enforcement point within an application;
an identity service ("IS") configured to provide a first token for enabling a user to access the application;
an access gateway configured to provide a second token, the second token including a list of at least a portion of the unique identifiers;
a hardware server having an entitlement server ("ES") to receive an entitlement request from the application, the entitlement request including the second token, the ES further configured to link a protected indicator for a user-authenticated session with the application to the entitlement request in the IS and include a digital signature of the application with the second token; and
a policy decision point ("PDP") configured to receive the list of at least a portion of the unique identifiers and to render a decision on the entitlement request based at least in part on policy information associated with ones of the enforcement point records identified by the unique identifiers of the list and attribute information from the IS, the attribute information dictated by the policy information and the PDP is configured to provide compliance events to a compliance enforcer that is configured to correlate the compliance events and compare against a best practice policy with deviations arising from a manner in which the ES, PDP, and the application are interoperating resulting in mitigation actions by the compliance enforcer, wherein at least one action, processed by the compliance enforcer, directs the user-authenticated session to a honeypot based on a particular deviation that occurs after the user-authenticated session was established and the at least one action based on a particular compliance event that is permitted by some of the policy information but overridden to be impermissible based on other ones of the compliance events and thereby producing the particular deviation; wherein subsequent to the rendering of a decision by the PDP, the decision is communicated to the application; and
the compliance enforcer for correlating and analyzing the compliance events received from at least one of the PDP, ES, and the application and, based on the correlating and analyzing, determining whether the mitigation actions are necessary.

2. The secure web application entitlement service of claim 1 further comprising a second IS, wherein the second IS is in a trust relationship with the first IS.

3. The secure web application entitlement service of claim 1 wherein the unique identifiers comprise REST URIs.

4. The secure web application entitlement service of claim 1 wherein the PDP and ES are comprise a single entity.

5. The secure web application entitlement service of claim 1 further comprising a plurality of additional ISes, wherein at least one of the additional ISes has a trust relationship with at least one other one of the additional ISes.

6. The secure web application entitlement service of claim 1 wherein the PDP and ES have a trust relationship with one of the ISes and wherein the AG and the application have a trust relationship with another one of the ISes.

7. The secure web application entitlement service of claim 1 further comprising a distributor for providing a secure communications channel between the ES and the application.

8. A method for providing a secure web application entitlement service residing in a non-transitory computer-readable storage media as instructions that when executed by a processor performs, the method comprising:

identifying, by the machine, a plurality of entitlement point records each comprising a unique identifier that permits each of enforcement point records to be associated with an enforcement point within an application;

providing, by the machine, a first token for enabling a user to access the application;

providing, by the machine, to the application a second token, the second token including a list of at least a portion of the unique identifiers;

receiving, by the machine, from the application an entitlement request comprising the second token and linking a protected indicator for a user-authenticated session with the application and include a digital signature of the application with the second token when the first token is provided; and responding, by the machine, to receipt of the list of at least a portion of the unique identifiers for rendering a decision on the entitlement request based at least in part on policy information associated with ones of the enforcement point records identified by the unique identifiers of the list and attribute information, the attribute information dictated by the policy information, and the attribute acquired when the first token is provided; wherein subsequent to the rendering of a decision, the decision is communicated to the application and providing compliance events to a compliance enforcer that is configured to correlate the compliance events and compare against a best practice policy with deviations arising from a manner in which the secure web entitled service, a policy decision point, and the application are interoperating resulting in mitigation actions by the compliance enforcer, wherein at least one action, processed by the compliance enforcer, directs the user-authenticated session to a honeypot based on a particular deviation that occurs after the user-authenticated session was established and the at least one action based on a particular compliance event that is permitted by some of the policy information but overridden to be impermissible based on other ones of the compliance events and thereby producing the particular deviation; and correlating and analyzing, by the machine, the compliance events received from associating, responding, and the application and, based on the correlating and analyzing, determining whether the mitigation actions are necessary.

9. The method of claim 8 wherein providing the first token further comprises using an identity service ("IS") and a second IS, wherein the second IS is in a trust relationship with the first IS.

10. The method of claim 8 wherein the unique identifiers comprise REST URIs.

11. The method of claim 8 wherein providing the first token further comprises using an identity service ("IS") and a plurality of additional ISes, wherein at least one of the additional ISes has a trust relationship with at least one other one of the additional ISes.

12. The method of claim 11 wherein responding further includes using a policy decision point ("PDP") and using an entitlement server ("ES") and wherein the PDP and ES have a trust relationship with one of the ISes and wherein the AG and the application have a trust relationship with another one of the ISes.

13. The method of claim 8 further comprising providing, by the machine, a secure communications channel between the processing for associating and the application.

14. A method for providing a secure web application entitlement service, the method comprising:

providing a plurality of entitlement point records each comprising a unique identifier that permits each of the enforcement point records to be associated with an enforcement point within an application;

providing a first token for enabling a user to access the application;

providing to the application a second token, the second token including a list of at least a portion of the unique identifiers;

receiving from the application an entitlement request comprising the second token and linking a protected indicator for a user-authenticated session with the application and including a digital signature of the application with the second token in the means for providing a first token;

responsive to receipt of the list of at least a portion of the unique identifiers, rendering a decision on the entitlement request based at least in part on policy information associated with ones of the enforcement point records identified by the unique identifiers of the list and attribute information, the attribute information dictated by the policy information, and the attribute information acquired when the first token is provided and providing compliance events to a compliance enforcer that is configured to correlate the compliance events and compare against a best practice policy with deviations arising from a manner in which the secure web entitled service, a policy decision point, and the application are interoperating resulting in mitigation actions by the compliance enforcer, wherein at least one action, processed by the compliance enforcer, is directing the user-authenticated session to a honeypot based on a particular deviation that occurs after the user-authenticated session was established and the at least one action based on a particular compliance event that is permitted by some of the policy information but overridden to be impermissible based on other ones of the compliance events and thereby producing the particular deviation, wherein rendering further includes correlating and analyzing the compliance events received and, based on the correlating and analyzing and determining whether the mitigation actions are necessary; and communicating the decision to the application.

15. The method of claim 14 wherein the providing a first token is performed by a first identity service ("IS"), the method further comprising providing a second IS, wherein the second IS is in a trust relationship with the first IS.

16. The method of claim 14 wherein the providing a first token is performed by a first identity service ("IS"), the method further comprising providing a plurality of additional ISes, wherein at least one of the additional ISes has a trust relationship with at least one other one of the additional ISes.

17. The method of claim 14 wherein the associating is performed by an entitlement server, the method further comprising providing a secure communications channel between the entitlement server and the application.

* * * * *